United States Patent [19]
VanSiclen et al.

[11] Patent Number: 5,490,187
[45] Date of Patent: Feb. 6, 1996

[54] METHOD FOR GAS BUBBLE AND VOID CONTROL AND REMOVAL FROM METALS

[75] Inventors: Clinton D. Van Siclen; Richard N. Wright, both of Idaho Falls, Id.

[73] Assignee: Lockheed Idaho Technologies Company, Idaho Falls, Id.

[21] Appl. No.: 259,201

[22] Filed: Jun. 13, 1994

Related U.S. Application Data

[63] Continuation-in-part of Ser. No. 81,995, Jun. 23, 1993, abandoned.

[51] Int. Cl.⁶ .................................................. G21C 19/00
[52] U.S. Cl. ............................................ 376/310; 376/314
[58] Field of Search ..................................... 376/310, 314, 376/308, 311, 900; 420/554, 528; 148/688, 691, 401

[56] References Cited

U.S. PATENT DOCUMENTS 3,969,631   7/1976   Winsche et al. ..................... 376/310

OTHER PUBLICATIONS

Van Siclen et al., *Anamalous Helium Bubble Diffusion in Dilute Aluminum Alloys*, Physical Review Letters, vol. 68, No. 26, pp. 3892–3895 (Jun. 29, 1992).

*Primary Examiner*—Daniel D. Wasil
*Attorney, Agent, or Firm*—Alan D. Kirsch

[57] ABSTRACT

A method for enhancing the diffusion of gas bubbles or voids attached to impurity precipitates, and biasing their direction of migration out of the host metal (or metal alloy) by applying a temperature gradient across the host metal (or metal alloy). In the preferred embodiment of the present invention, the impurity metal is insoluble in the host metal and has a melting point lower than the melting point of the host material. Also, preferably the impurity metal is lead or indium and the host metal is aluminum or a metal alloy.

20 Claims, 2 Drawing Sheets

METHOD FOR GAS BUBBLE AND VOID CONTROL AND REMOVAL FROM METALS

CONTRACTURAL ORIGIN OF THE INVENTION

The United States Government has rights in this invention pursuant to Contract No. DE-AC07-76ID01570 between the U.S. Department of Energy and EG&G Idaho, Inc. This is a continuation-in-part of application Ser. No. 08/081,995 filed Jun. 23, 1993, now abandoned.

BACKGROUND OF THE INVENTION

This invention relates to a method for controlling the migration and removal of gas bubbles and voids from a metal material.

Nuclear reactor lifetimes are influenced by the structural damage due to gas bubbles and voids. The formation and growth of helium bubbles in metals and alloys following $(n,\alpha)$ reactions or $\alpha$ implantation are of practical interest due to the long-term deleterious effects of inert gases in fission and fusion reactor structural materials, such as reactor fuel cladding or containment structural materials. Because inert gas atoms are essentially insoluble in all metals, bubbles quickly nucleate at defects in the host lattice and subsequently grow by acquisition of additional gas atoms (and capture of vacancies to lower the gas pressure within the bubble) and by bubble migration and coalescence. In multiphase alloys, inert gas bubbles are typically found at matrix/precipitate interfaces.

It is an object of this invention to provide a process whereby inert gas bubbles and voids are removed from fusion and fission reactor materials.

It is another object of this invention to provide a process whereby impurity metal particles attached to the bubbles or voids are melted to provide a liquid coating to allow the bubble or void to migrate with much greater velocity than is otherwise possible.

It is still a further object of this invention to provide a process for biasing the direction of migration of the bubble or void out of a metal by applying a temperature gradient across the metal.

Additional objects, advantages and novel features of the invention will become apparent to those skilled in the art upon examination of the following and by practice of the invention.

SUMMARY OF THE INVENTION

To achieve the foregoing and other objects, a method is provided for biasing the direction of migration of gas bubbles or voids out of a host metal (or metal alloy), which contains impurity metal particles, by applying a temperature gradient across the host metal (or metal alloy). In the preferred embodiment of the present invention, the impurity metal particles are insoluble in the host metal and have a melting point lower than the melting point of the host material. By melting the impurity metal particles, but not the host metal, the liquid impurity metal is distributed over the surface of the inert gas bubbles or voids, thereby enhancing bubble diffusion in the host metal. Also, preferably the impurity metal is lead or indium and the host metal is aluminum or a metal alloy. Operating fusion and fission reactors can provide the required temperature gradient during normal operating conditions, thereby removing the gas bubbles or voids without interruption of operations. Alternatively, an external heating source (e.g., electrical resistance heating) can be used to provide the required temperature gradient when the reactor is off line.

BRIEF DESCRIPTION OF THE DRAWINGS

The present invention is illustrated in the accompanying drawings where.

DETAILED DESCRIPTION OF THE INVENTION

Figure 1:
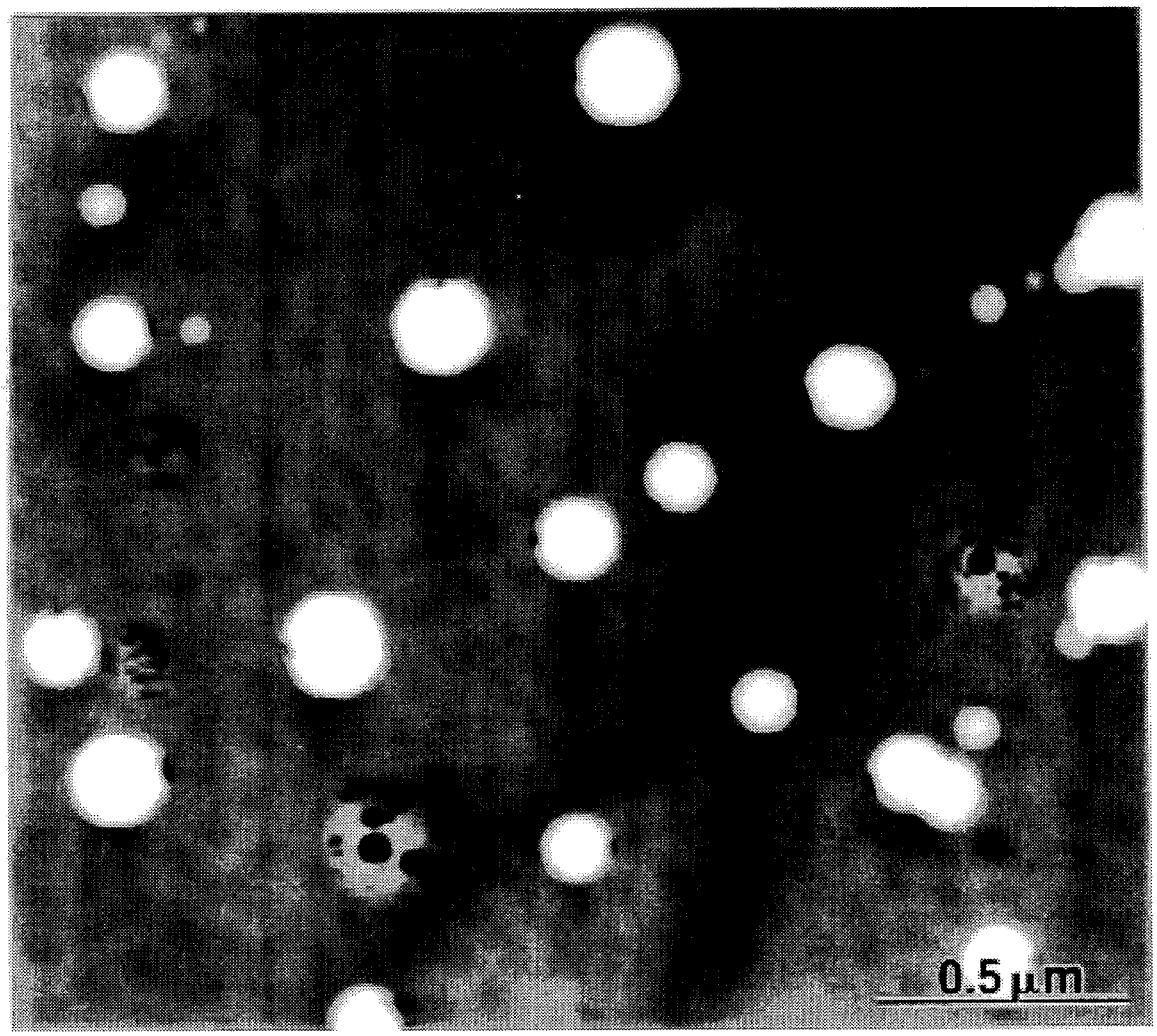
FIG. 1 is a bright-field electron micrograph showing solid indium precipitates attached to preferred facets of helium bubbles in the aluminum matrix.

Experimental studies by Applicants have led to in situ observations by hot-stage transmission electron microscopy (TEM) of anomalously rapid helium bubble diffusion in aluminum with a low concentration of lead, and in aluminum with a low concentration of indium, at annealing temperatures above the melting point of the impurity species. In these experimental studies, samples of 99.999% pure aluminum alloyed with 200 ppm by weight of lead, and separately, with 1000 ppm by weight of indium, were thinned to electron transparency and subsequently irradiated with 50-keV helium ions to produce a helium concentration of approximately 20 atomic ppm. The implanted samples were then annealed at 723–743 K for several minutes, during which time video recordings were made of spherical helium bubbles undergoing Brownian motion and eventually coalescing or disappearing at a foil surface. The participation of the impurity, which is not visibly apparent at the annealing temperature, was verified in each case by cycling the sample temperature between room temperature and the annealing temperature. It was observed that solid precipitates attached to helium bubble facets appeared during slow cooling to room temperature but did not appear during a rapid quench. In the latter case, the precipitate subsequently formed at approximately 520 K, and disappeared again above the melting temperature of the impurity, as the sample temperature was increased. This is shown in FIG. 1 which is a bright-field electron micrograph, taken after slow cooling the aluminum matrix to room temperature. FIG. 1 shows solid indium precipitates (dark spots) attached to preferred helium bubbles (white spheres) in the aluminum matrix. Also apparent in FIG. 1 as collections of dark spots (indium) superimposed on the light spherical region are remnants of helium bubbles that have reached a foil surface. FIG. 1 also illustrates the insolubility of the indium with the host aluminum metal.

Video images were used to obtain bubble diffusion coefficients $D_b$ at the annealing temperatures in the following manner. Spatial displacements transverse to the electron beam were measured for each of several lead- and indium-coated bubbles during successive 1 second time intervals. The collection of N measurements for each bubble must possess (in the limit of an infinite number of measurements) a Gaussian probability distribution, since the N measurements can be regarded as single measurements for N non-interacting, identical bubbles, all initially located together on a two-dimensional plane at r=0 and at time t=0. Thus the radial distribution of measurements r at time t can be expressed by the following equation:

$$p(r) = 2\pi r \frac{N}{4\pi D_b t} \exp[-r^2/4D_b t]$$

so that integrating p over the entire plane produces the total N measurements. The number of displacements r between $r_i$ and $r_j$ (with $r_i<r_j$) is then approximately $$n_{ij}=N \exp [-r_i^2/4D_b t]-N \exp [-r_j^2/4D_b t]$$

This expression provides the areas $N_{i,i+1}$ for Gaussian histograms that are compared to the histograms of measured bubble displacements. The bubble diffusion coefficient $D_b$, that provides the best match, for each of the monitored helium bubbles, is presented in the following Table 1.

TABLE 1

|       | R (nm) | $D_b$ (nm²/s) | $D_s$ (μm²/s) |
|-------|--------|---------------|---------------|
| Pb/He | 5.15   | 2.0           | 0.70          |
|       | 6.0    | 1.2           | 0.77          |
| In/He | 7.9    | 2.0           | 3.85          |
|       | 16.0   | 7.0           | 227.0         |
|       | 26.5   | 0.8           | 195.0         |

Figure 2:
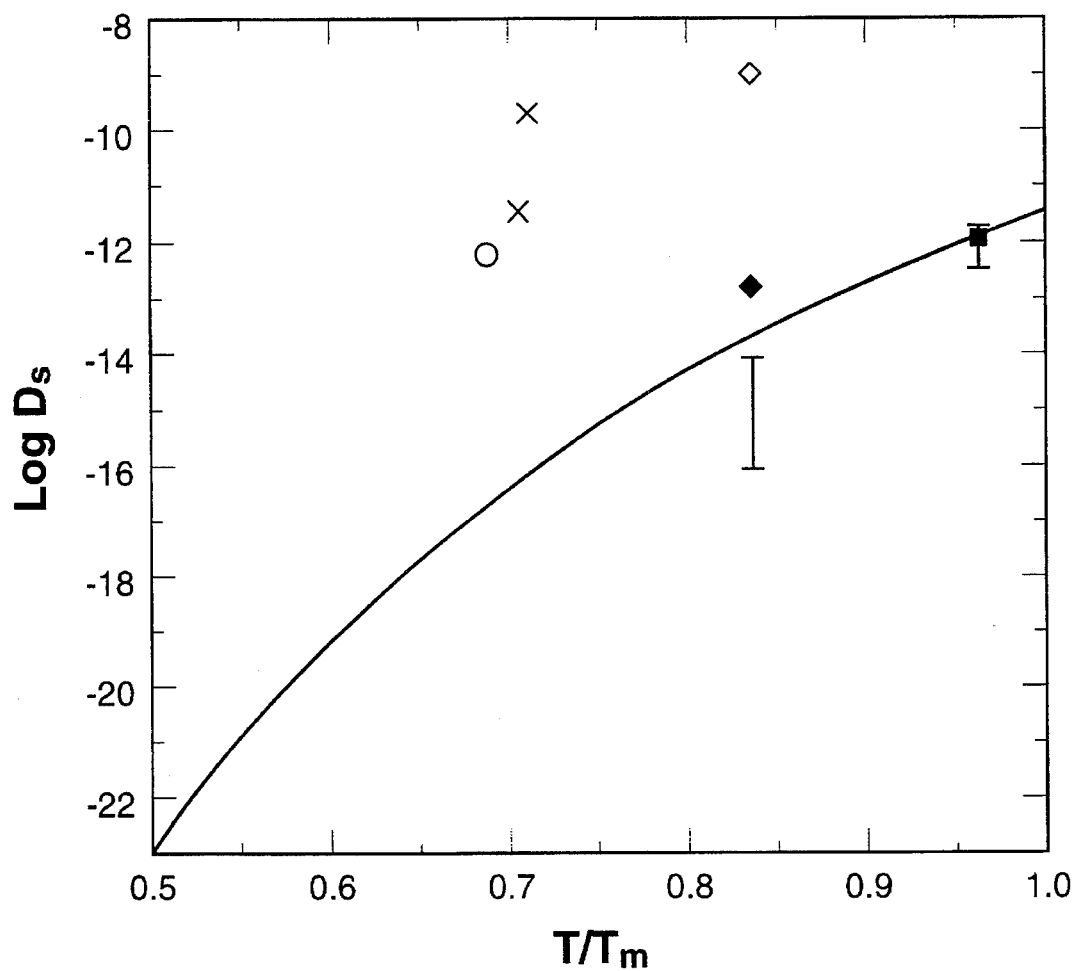
FIG. 2 is a graph showing the calculated surface diffusion coefficients as a function of the annealing temperature.

The rapid bubble diffusion shown in Table 1 results from enhanced diffusion of aluminum atoms at the bubble/matrix interface. If the latter is assumed independent of bubble size, the corresponding surface diffusion coefficients $D_s$ may be calculated from the following standard relationship:

$$D_b=(3\Omega^{4/3}/2\pi R^4)D_s$$

where R is the gas bubble radius and $\Omega$ is the volume of a matrix atom. These values are given in Table 1 and are also presented in FIG. 2 together with $D_s$ taken from other experiments showing helium bubble growth in pure aluminum at various annealing temperatures. FIG. 2 shows the calculated surface diffusion coefficients $D_s$ plotted against the scaled annealing temperature $T/T_m$ for helium bubble diffusion in aluminum. In FIG. 2, $T_m$ is the melting temperature (933 K) of the aluminum matrix. The open circles and the crosses shown in FIG. 2 indicate values of $D_s$ for bubbles with attached liquid lead and indium precipitates, respectively, determined from direct observation of their Brownian motion at 723–743 K. (The numerical values are shown in Table 1). The open and solid diamonds in FIG. 2 indicate the $D_s$ (m²s⁻¹) values for helium bubbles with and without attached lead precipitates, respectively, at 823 K, derived from experimental studies by Applicants. The solid circle shows the average value of $D_s$ determined from measurements of coarsening of helium bubbles in neutron-irradiated, helium-implanted pure aluminum, during annealing at 0.96 $T_m$. The bars associated with that point indicate the range of five values. The solid curve shown in FIG. 2 is obtained from the expression $$D_s=0.086 \exp [-(2.1 \text{ eV})/kT]m^2s^{-1}$$

which is a fit to the data point with a 2.1 eV activation energy for surface diffusion. The bars at $0.83T_m$ (823 K) indicate the estimate of $D_s$ derived from similar measurements of bubble growth in helium-implanted pure aluminum.

The mechanism by which atomic diffusion at the bubble surface is increased is unclear. However, it is important to note that the binary phase diagrams for these aluminum alloys show negligible solubility of the impurity in the matrix material so that the impurity will segregate to the free surfaces provided by the gas bubbles; an impurity melting temperature lower than that of the matrix and of the annealing temperature; and some solubility of the matrix atoms in the liquid impurity. These characteristics suggest a liquid dissolution process, whereby a liquid layer of impurity atoms at the bubble surface acts as a conduit for rapid transport of dissolved aluminum atoms.

Two liquid dissolution mechanisms for bubble diffusion, that rely on the properties of the attached liquid precipitates have been considered by Applicants. Volume diffusion of an equilibrium concentration of aluminum atoms through a thin layer of liquid impurity at the bubble surface produces bubble diffusion coefficients in good agreement with those derived from observations. Alternatively, the liquid coating may instead simply remove the bubble facets.

In a preferred embodiment of the present invention, the direction of bubble or void migration is biased by the application of a temperature gradient across the host metal or alloy which contains small amounts of impurities, such as lead or indium. For example, those skilled in the art of nuclear reactor technology know that during the fission process the internal temperature of a fuel rod will be greater than the external or cladding temperature, thereby constituting a temperature gradient across the fuel rod cladding. The same is true for nuclear reactor containment structural materials, wherein the internal surface temperature of a containment vessel will be greater than the external surface temperature, thereby creating a temperature gradient across the containment structural material. The temperature gradient to be applied should be such that the higher temperature is greater that the melting point of the impurity metal particles, but lower than the melting point of the host metal or metal alloy. The diffusing surface atoms will tend to move from the hotter side of the bubble or void toward the colder side, thus producing a net movement of the bubble or void up the temperature gradient and out of the metal/alloy material. Controlling the migration of the bubbles and voids is particularly advantageous in fusion and fission reactors and results in preventing the known long-term deleterious effects of inert gases in the reactor cladding or containment structural materials.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A method for removing inert gas bubbles and voids from fusion and fission reactor cladding or containment materials to prevent the long-term deleterious effects of inert gases in said reactor materials caused by the operation of said fusion and fission reactors, comprising the steps of:

(a) providing a reactor material host metal containing at least 100 parts per million of impurity metal particles within said host metal, said impurity metal particles being substantially insoluble in the host metal and having a melting point lower than the melting point of the host metal;

(b) applying heat to the host metal to create a temperature gradient across the host metal, the temperature gradient having a high temperature region greater than the melting point of the impurity metal but lower than the melting point of the host metal, the applied temperature gradient causing the impurity metal particles to melt and distribute over the surface of the bubbles or voids to enhance bubble or void diffusion, and biasing the direction of bubble or void migration toward the high temperature.

2. The method of claim 1 wherein the host metal is aluminum.

3. The method of claim 1 wherein the host metal is a metal alloy.

4. The method of claim 1 wherein the impurity metal is lead.

5. The method of claim 4 wherein the host metal contains approximately 200 ppm by weight of lead.

6. The method of claim 1 wherein the impurity metal is indium.

7. The method of claim 6 wherein the host metal contains approximately 100 ppm by weight of indium.

8. The method of claim 1 wherein the gas bubble is a helium gas bubble.

9. The method of claim 1 wherein the temperature gradient is in the range of 723–743 Kelvin.

10. The method of claim 1 wherein a heating source external to the reactor material is used to provide the temperature gradient across the host metal.

11. A method for removing inert gas bubbles and voids from fusion and fission reactor cladding or containment materials to prevent the long-term deleterious effects of inert gases in said reactor materials caused by the operation of said fusion and fission reactors, comprising the steps of:

(a) providing a reactor material host metal containing at least 100 parts per million of impurity metal particles within said host metal, said impurity metal particles being substantially insoluble in the host metal and having a melting point lower than the melting point of the host metal;

(b) elevating the temperature of a portion of the host metal to a temperature greater than the melting point of the impurity metal but lower than the melting point of the host metal causing the impurity metal particles to melt and distribute over the surface of the bubbles or voids to enhance bubble or void diffusion, and biasing the direction of bubble or void migration toward said heated portion of said host metal.

12. The method of claim 11 wherein the host metal is aluminum.

13. The method of claim 11 wherein the host metal is a metal alloy.

14. The method of claim 11 wherein the impurity metal is lead.

15. The method of claim 14 wherein the host metal contains approximately 200 ppm by weight of lead.

16. The method of claim 11 wherein the impurity metal is indium.

17. The method of claim 16 wherein the host metal contains approximately 100 ppm by weight of indium.

18. The method of claim 11 wherein the gas bubble is a helium gas bubble.

19. The method of claim 11 wherein the elevated temperature of the host metal is in the range of 723–743 Kelvin.

20. The method of claim 11 wherein a heating source external to the reactor material is used to provide the elevated temperature.

* * * * *